United States Patent [19]
Williams

[11] Patent Number: 5,533,781
[45] Date of Patent: Jul. 9, 1996

[54] ARMORING ASSEMBLY

[75] Inventor: Charles A. Williams, Cincinnati, Ohio

[73] Assignee: O'Gara-Hess & Eisenhardt Armoring Co., Inc., Fairfield, Ohio

[21] Appl. No.: 262,768

[22] Filed: Jun. 20, 1994

[51] Int. Cl.⁶ .................. B62D 23/00; F41H 7/04
[52] U.S. Cl. ........................ 296/204; 89/36.08
[58] Field of Search .................. 296/204, 187, 296/39.1; 89/36.02, 36.08

[56] References Cited

U.S. PATENT DOCUMENTS

| | | |
|---|---|---|
| 2,348,130 | 5/1944 | Hardy, Jr. . |
| 3,575,786 | 4/1971 | Baker et al. . |
| 3,699,842 | 10/1972 | Grewing et al. . |
| 4,061,815 | 12/1977 | Poole, Jr. . |
| 4,111,097 | 9/1978 | Lasker . |
| 4,131,053 | 12/1978 | Ferguson . |
| 4,186,648 | 2/1980 | Clausen et al. . |
| 4,198,454 | 4/1980 | Norton . |
| 4,323,000 | 4/1982 | Dennis et al. . |
| 4,326,445 | 4/1982 | Bemiss . |
| 4,398,446 | 8/1983 | Pagano et al. ............ 89/36.08 |
| 4,404,889 | 9/1983 | Miguel . |
| 4,529,640 | 7/1985 | Brown et al. . |
| 4,566,237 | 1/1986 | Turner . |
| 4,716,810 | 1/1988 | DeGuvera . |
| 4,841,838 | 6/1989 | Scully et al. ............ 89/36.08 |
| 5,059,467 | 10/1991 | Berkovitz . |
| 5,179,244 | 1/1993 | Zufle . |
| 5,314,230 | 5/1994 | Hutchinson et al. ........ 296/204 X |

FOREIGN PATENT DOCUMENTS

| | | | |
|---|---|---|---|
| 2706997 | 12/1994 | France ................. | 89/36.08 |
| 3627485 | 2/1988 | Germany ............... | 89/36.08 |
| 4136699 | 5/1992 | Japan ................. | 89/36.08 |

OTHER PUBLICATIONS

Ballistic Penetration of S–2 Glass Laminates.
S2 Glass® Fiber Bridges The Reinforcement Gap May 7, 1980.
S–2 Glass® Fiber High Performance/Low Cost Reinforcements, Copyright 1984.

Primary Examiner—Joseph D. Pape
Attorney, Agent, or Firm—Wood, Herron & Evans

[57] ABSTRACT

A land vehicle has a floor with upper and lower surfaces. Fibrous material is bonded to the upper surface of the floor, and a ballistic panel/blast shield is disposed below the floor and is spaced from the lower surface of the floor to create an air gap between the panel and floor. Mechanical fasteners secure the panel to the vehicle. Resilient material is disposed between the vehicle and the panel at the fasteners. The panel, air gap, resilient material and flooring provide resistance to blast pressure. The flooring and fibrous material trap flying shrapnell fragments.

21 Claims, 3 Drawing Sheets

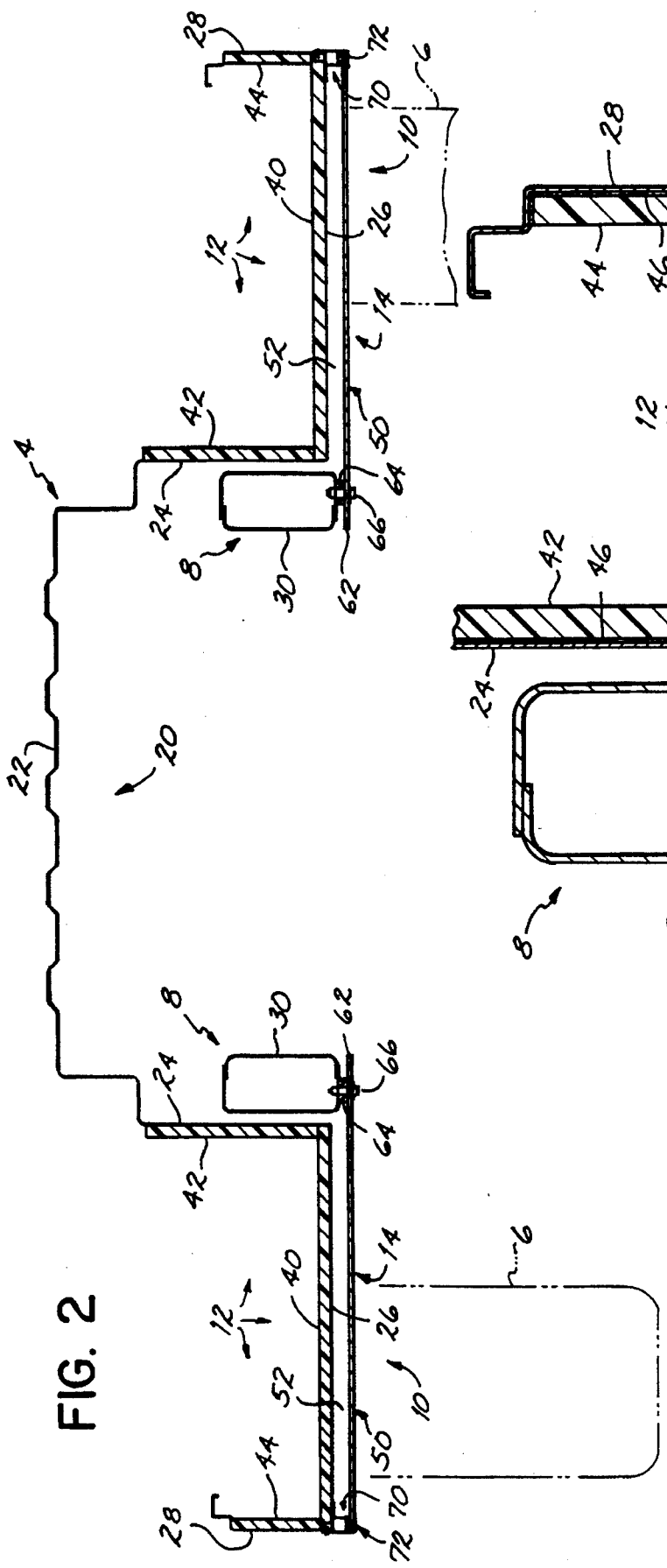

ARMORING ASSEMBLY

FIELD OF THE INVENTION

This invention relates generally to armoring, and more particularly to an armoring system for the underbody of military land vehicles and other types of vehicles and structures.

BACKGROUND OF THE INVENTION

Military vehicles, for example, the HMMWV ("Humvee") military land vehicle, may encounter many, and at least three types, of explosives: (1) anti-tank mines, (2) anti-personnel mines and (3) claymores. In the case of these types of destructive devices, these devices may be detonated by the pressure of one or more of the tires or wheels of the vehicle rolling over them, or by remote detonation.

The anti-tank and anti-personnel mines generally rely on pure blast pressure for destructive incapacitative effect. The claymores, on the other hand, have a lower blast pressure than that characteristic of the anti-tank mines. The claymores rely primarily on hundreds of flying shrapnel fragments for incapacitation effect.

Thus, the underbody of military land vehicles, and in particular the lateralmost portions of the underbody adjacent and around or over the vehicle wheels, must be protected against both pure blast pressure and flying shrapnel fragments to ensure survival of the occupants of the vehicle.

One prior system for armoring the underbody of a road vehicle is shown in U.S. Pat. No. 4,326,445. In that patent, a plurality of armor protection plates of the underbody protect the underneath of the vehicle from upwardly directed projectiles.

Past efforts at equipping such military land vehicles to withstand these two types of loadings have not met with complete success.

SUMMARY OF THE INVENTION

It has therefore been an objective of the present invention to provide an armoring technique or system for protecting the underbody of a military vehicle against the high pressures of a pure blast and against the effect of hundreds of flying shrapnel fragments as well as against kinetic energy projectiles.

It has been another objective of the present invention to provide an armoring technique which can be employed in any type of structure, and not necessarily just in a military land or other vehicle, which requires blast and shrapnel fragment protection and kinetic energy projectile protection.

The present invention attains the stated objectives by providing, in a land vehicle with a floor having upper and lower floor surfaces, blast pressure and shrapnel fragment defeating structure for the vehicle. This structure comprises fibrous material secured to the upper surface of the floor, and a ballistic panel/blast shield disposed below the lower surface of the floor and spaced therefrom so as to form an air gap therebetween.

In a typical application, such a military land vehicle would be an HMMWV vehicle having a floor fabricated from aluminum about 0.060" thick. The fibrous material employed is preferably a rigid glass fiber-reinforced phenolic plastic material fabricated from S2 Glass® fibers manufactured by Owens Corning Fiberglass of Toledo, Ohio, and may be about 0.36" to 0.60" thick; other rigid fibrous materials may be used. The fibrous material is preferably bonded to the vehicle floor with a high elongation urethane resin adhesive such as beta seal thixotropic black sealant, manufactured by Essex Specialty Products of Clifton, N.J., designated as 558-02. The ballistic panel/blast shield is fabricated from steel armor plate about 0.125" thick. The steel used in the front half of the vehicle, the area of greatest threat in one application, is preferably "Jessop 529" manufactured by Allegheny/Ludlum, Jessop Specialty Products, of Washington, Pa.; that used in the rear half of the vehicle is preferably manufactured according to Mil-A-46177. Alternatively, "Jessop 529" could be used for the entire vehicle, Mil-A-46177 could be used for the entire vehicle, or other suitable steel armor plate such as Mil-A-12560 could be used. The ballistic panel/blast shield and floor form an air gap therebetween of about 1.6" to 1.8".

According to another aspect of the present invention, fasteners secure the blast shield to the vehicle, for example to the vehicle frame and/or flooring. Resilient elastomeric material is disposed between the panel and the vehicle in the area of the fasteners. The ballistic panel/blast shield is preferably secured at its laterally outboard and inboard edges to the vehicle. The material used at the inboard connection is about 0.5" thick by 1.18" wide 60 durometer rubber. That used at the outboard connection is about 0.25" thick by 2.0" wide closed cell foam.

The combination of ballistic panel/blast shield, air space, resilient material, vehicle flooring and fibrous material yields an improved degree of occupant survivability due to the combination of direct and over-pressure blast protection and fragment protection that this layup provides, in comparison to previous systems. The ballistic panel/blast shield, air space, resilient material and floor section of the layup effectively absorbs the energy generated by the blast pressure, whereas if the ballistic panel/blast shield ruptures, the flooring and fibrous material section of the layup tends to trap or capture and hence defeat the flying shrapnel fragments.

In yet a further aspect of the present invention, a land vehicle has a floor having upper and lower surfaces and also has at least one wall connected to the floor, extending upwardly therefrom and having an inner surface. The fibrous material is bonded to the upper surface of the floor and to the inner surface of the wall. The fibrous material may be applied in one or two layers. By bonding the fibrous material to both the horizontal and vertical vehicle structures, the vertical structure increases the structural integrity of the horizontal flooring structure by increasing the resistance of the flooring to upward deflections due to blast pressure, since the horizontal flooring is tied into the vertical structure via the fibrous material being bonded to both horizontal and vertical structures.

The present invention also lends itself to the application of armoring the sides of the vehicle. Normally the invention will be applied to at least the floor of the vehicle; extending the armoring of the invention upwardly at least part way up the vehicle sides provides improved protection. In that case, the fibrous material is bonded to the inner side of the vehicle body, and the ballistic panel/blast shield is attached to the outer side of the vehicle body with either mechanical fasteners or a combination of mechanical fasteners and resilient material, again creating an air gap between the ballistic panel/blast shield and the vehicle body.

The major advantage of the present invention is that the survivability of the occupants of a military land vehicle is increased. The vehicle is better equipped to withstand the blast pressure of anti-tank and anti-personnel mines and the flying shrapnel of a claymore-while also withstanding kinetic energy projectiles. The invention lends itself to being incorporated into newly manufactured vehicles as well as to the retrofit of existing vehicles.

These and other objects and advantages of the present invention will become more readily apparent during the following detailed description taken in conjunction with the drawings herein, in which:

BRIEF DESCRIPTION OF DRAWINGS

FIG. 2 is a view taken along line 2—2 of FIG. 1; and

FIG. 3 is an enlarged view of the right hand portion of FIG. 2; and

DETAILED DESCRIPTION OF THE INVENTION

Figure 1:
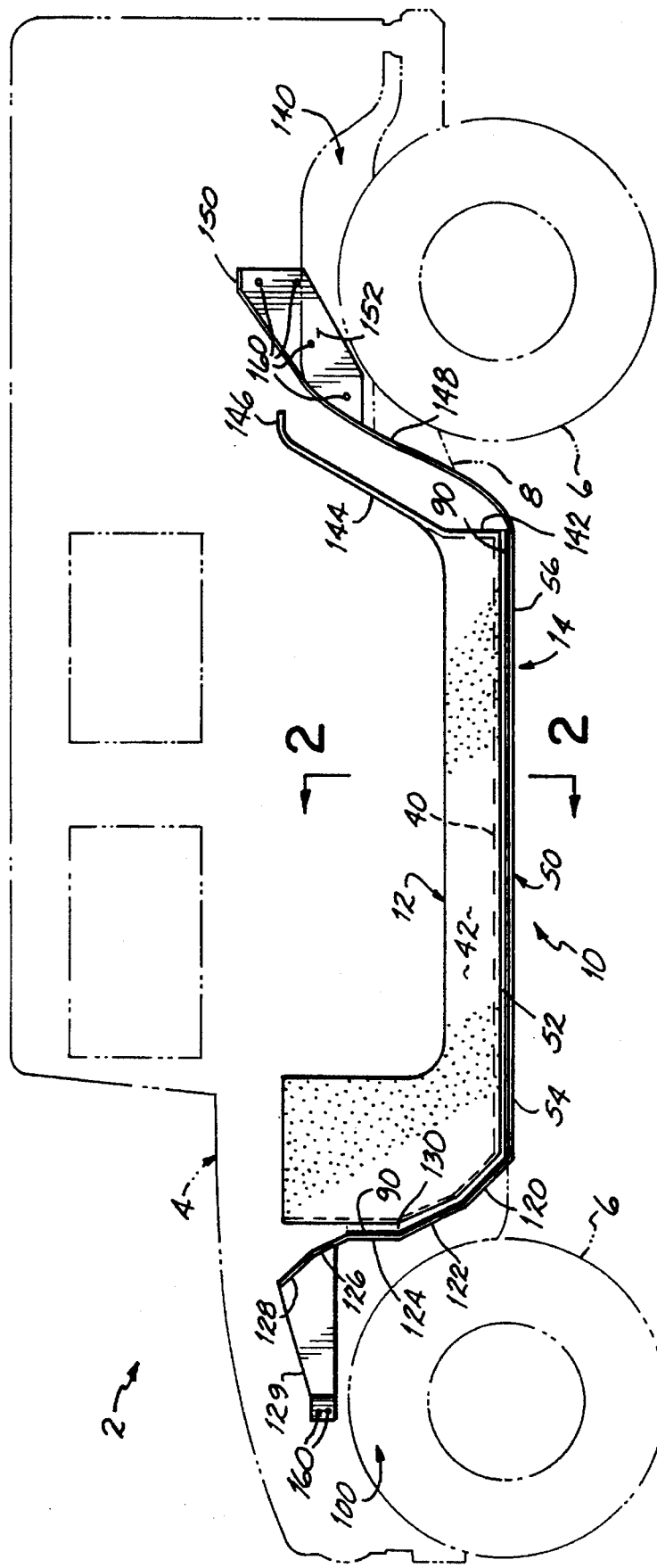
FIG. 1 is a side elevational view of a land vehicle employing the underbody armor of the present invention.

Referring first to FIG. 1, there is illustrated an HMMWV military land vehicle 2 embodying a preferred form of the armoring assembly of the present invention.

Referring to all the Figures, the military land vehicle 2 comprises, generally, a skin or body 4, tires 6 and a vehicle frame 8. The armoring system of the present invention for the underbody of the vehicle 2 is designated generally by the numeral 10. Referring to FIGS. 1–3, the major components of the armoring system 10 include fibrous material 12 applied to the interior of the vehicle body 4 in the underbody region thereof and a blast shield/ballistic panel 14 positioned below the underbody of the vehicle 4.

Figure 4:
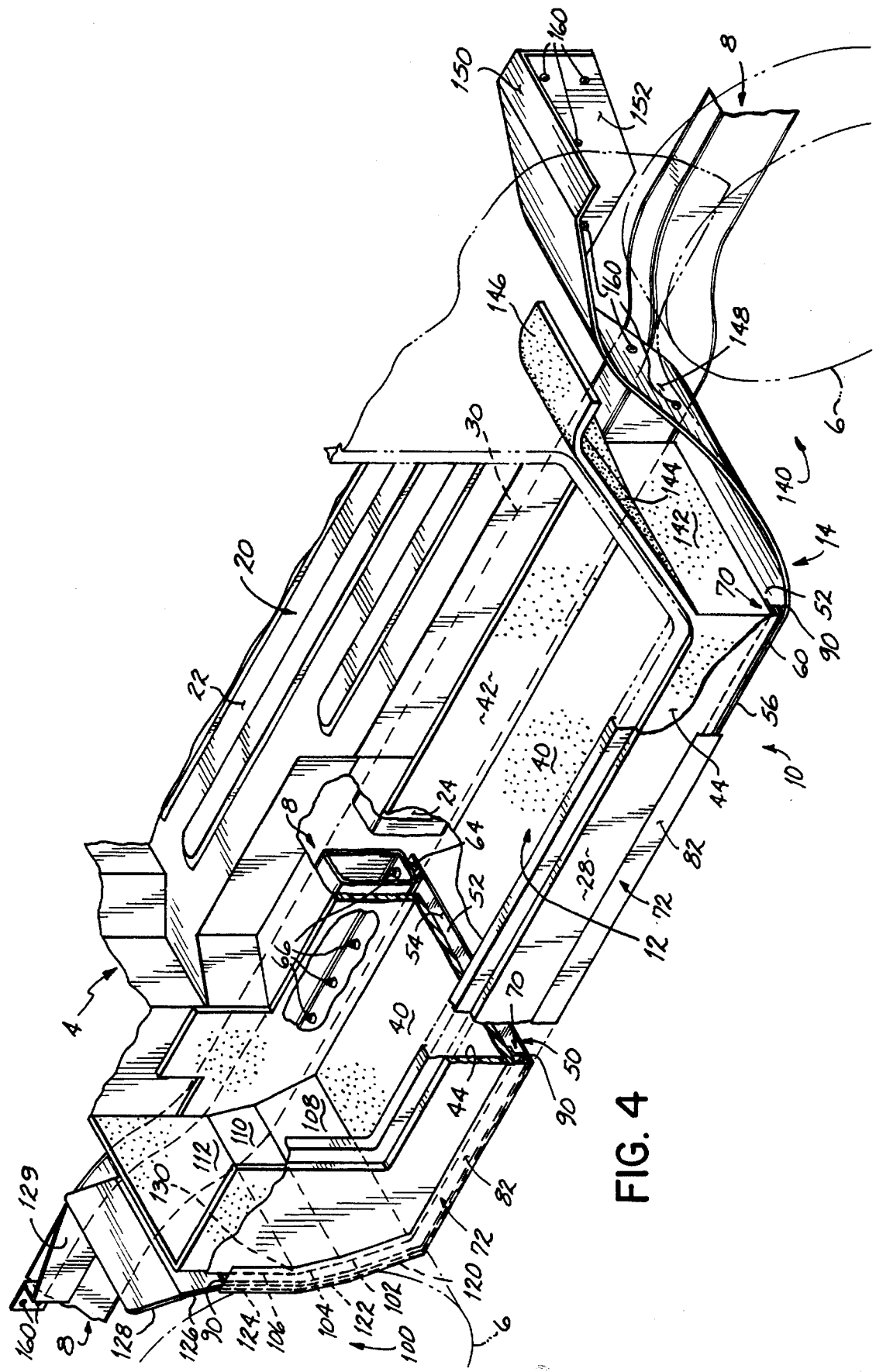
FIG. 4 is a partial prospective view of the vehicle of FIG. 1.

More particularly, and referring now to FIGS. 2–4, the underbody or lower region of the body 4 of the vehicle 2 is generally W-shaped and includes a central tunnel structure 20, extending laterally between the tires 6 on opposite sides of the vehicle 2, including a top wall or raised floor portion 22, a pair of side walls 24, 24 depending from either lateral edge of the top wall 22, a pair of floor sections 26, 26, extending longitudinally between the tires 6 on opposite ends of the vehicle 2, connected to the bottom edges of the walls 24, 24 and extending laterally outwardly therefrom, and a second pair of vertical walls 28, 28 extending upwardly from the laterally outwardmost edges of the floor sections 26, 26.

The aforementioned vehicle frame 8 includes a longitudinally spanning rectangular cross section beam member 30 spaced inwardly from the vertical walls 24 of the tunnel structure 20 of the body 4.

The fibrous material 12 is applied in three areas to the tunnel structure 20. A bottom layer 40 is applied to the upper surface of each of the floor sections 26. A first vertical layer 42 is applied to the vehicle interior surface of each of the tunnel vertical wall sections 24. A second vertical layer 44 is applied to the vehicle interior surface of each of the vertical sections 28. The sections 24, 26 and 28 of the vehicle body 4, for a conventional HMMWV type vehicle, are fabricated of 0.06" thick aluminum. The fibrous material 12 applied thereto is preferably about 0.36" to 0.60" thick rigid glass fiber-reinforced phenolic plastic material. A preferable glass fiber reinforcement material for this application is known as S2 Glass® and is manufactured by Owens Corning Fiberglass of Toledo, Ohio. S2 Glass® has high tensile, high impact and high fatigue strengths. When wetted with resin, for example phenolic resin, the resin impregnated S2 Glass® can be compression molded into panels for placement into the vehicle 4. The fibrous material 12 is bonded or adhesively secured to the sections 24, 26 and 28 preferably with a high elongation urethane resin adhesive 46 such as that manufactured by Essex Specialty Products of Clifton, N.J., designated as 558-02.

Each ballistic panel/blast shield 14 takes the form of a steel armor plate 50 disposed beneath the lower surface of each floor section 26 of the tunnel structure 20 and is spaced therefrom as to define an air gap 52 therebetween. The steel armor plate 50 resists both projectiles and blast pressure. The air gap 52 is preferably about 1.6" to 1.8" for the Humvee vehicle but may be other values either less or more in other vehicles. The steel plate 50 is preferably fabricated from about 0.125" thick steel armor plate. The front underbody portion 54 of the steel plate 50 is preferably "Jessop 529" steel manufactured by Allegheny/Ludlum, Jessop Specialty Products, of Washington, Pa. The rear underbody portion 56 of the plate 50 is preferably manufactured according to Mil-A-46177 Alternatively, "Jessop 529" could be used for the entire vehicle, Mil-A-46177 could be used for the entire vehicle, or other suitable steel armor plate such as Mil-A-12560 could be used depending on the threat level to be encountered or the specific application or specification to be met.

Each plate 50 includes a lateral outboard edge 60 and a lateral inboard edge 62. The lateral inboard edge 62 is spaced from the frame member 30 by a spacer 64 disposed therebetween. Spacer 64 is fabricated from a resilient elastomeric material, and preferably is fabricated from an about 0.5" thick by 1.18" wide 60 durometer rubber. A bolt, washer, lock washer and rivnut assembly 66 secures the plate 50 and spacer 64 to the frame member 30.

The lateral outboard edge 60 of plate 50 is secured between a depending portion 70 of vertical wall 28 of body 4 and a bracket 72. Depending portion 70 is generally U-shaped and has a depending vertical section 74, and inwardly projecting horizontal section 76, an upwardly projecting vertical section 78, and an inwardly projecting horizontal section 80. The upper surface of horizontal section 80 abuts the lower surface of floor section 26.

Bracket 72 includes a depending vertical leg section 82 and an inwardly projecting horizontal foot section 84. Bracket 72 is secured to wall 28 and an upturned portion 86 of floor section 26 via a rivet 88.

The lower surface of edge 60 of plate 50 rides atop the upper surface of foot 84 of bracket 72. Disposed between the upper surface of plate 50 at edge 60 and the lower surface of horizontal section 76 of the portion 70 of wall 28 is another spacer 90. Spacer 90 is fabricated of resilient elastomeric material and preferably is fabricated from about 0.25" thick by 2.0" wide closed cell foam. Resilient spacers 64 and 90 not only help to absorb energy from a detonated explosive but also provide resilience between the body 4, ballistic panel/blast shield 14 and vehicle frame 8, as the body and frame tend to move relative to one another during operation of the vehicle.

Referring to FIG. 4, it will be seen that, in the area of the front wheel well 100, floor section 26 curves upwardly in the form of three planar portions 102, 104 and 106. Fibrous material 12 is likewise applied in three planar portions 108, 110 and 112 to the portions 102, 104, 106 respectively. The blast shield or ballistic panel/blast shield 14 likewise extends upwardly in the area of the front wheel well 100 in the form of five planar sections or plates 120, 122, 124, 126 and 128. A forward planar section 129 is connected to plates 126 and 128, extends forwardly therefrom, and is secured to another portion of the vehicle frame 8 (not shown for clarity purposes) with mechanical fasteners 160. Spaces or strip 90 extends forwardly and upwardly at 130 between the body panels 102, 104, 106 and the ballistic panels/blast shields 120, 122 and 124.

In the area of the rear wheel well 140, an upwardly extending layer of fibrous material 142 is applied to an upstanding vertical wall (not shown for clarity purposes) of the body 4. In addition, an upwardly and rearwardly extending layer of fibrous material 144 is applied to that same portion of the body and terminates at an upper end in a generally horizontal portion 146.

An upwardly and rearwardly extending section 148 of the blast shield or ballistic panel/blast shield 14 is secured to another portion of the vehicle body 4 (also not shown for clarity purposes) by mechanical fasteners 160, and terminates in an upper horizontal section 150. A rear planar section 152 is connected between the portions 148 and 150, and is likewise secured to a portion of the vehicle body 4 with mechanical fasteners 160.

The vehicle 2 equipped with the armoring system 10 of the present invention yields a relatively high degree of occupant survivability. The armoring system 10 provides direct and overpressure blast protection from anti-tank and anti-personnel mines, as well as shrapnell fragment protection generated by claymores and further kinetic energy projectile protection. In use, the ballistic panel/blast shield or blast shield, air space, resilient material and floor section of the armor 10 effectively absorbs the energy generated by the blast pressure. If the ballistic panel/blast shield ruptures, the flooring and fibrous material of the armor 10 trap or capture the flying shrapnell fragments and hence defeat their incapacitation effect.

A further advantage in use of the vehicle equipped with the present invention is that by bonding the fibrous material to the horizontal floor sections as well as to the vertical sections of the tunnel structure on either lateral side of each of the floor sections, the horizontal floor section has increased structural integrity. The horizontal floor section is more resistant to upward deflections caused by blast pressure since the adhesively bonded fibrous material on the vertical sections is able to resist these deflections through sheer load resistance transferred back to the vertical sections.

Those skilled in the art will readily recognize numerous adaptations and modifications which can be made to the present invention which will result in an improved armoring system, yet all of which will fall within the spirit and scope of the present invention as defined in the claims. For example, the present invention could be employed on the vertical sides of the vehicle body as well since the invention provides not only blast pressure and fragment protection but also kinetic energy projectile protection. Fibrous material would be bonded to the inner sides of the vehicle body, and the ballistic panel/blast shield would be attached to the outer vehicle body sides with mechanical fasteners or mechanical fasteners and resilient material, creating an air gap between the ballistic panel/blast shield and the vehicle body. In addition, the present armoring technique could be employed in vehicles other than land vehicles, and in other structures other than vehicles, where blast pressure resistance and shrapnell fragment resistance is desired. Further, other materials, other than S2 Glass®, could be employed to reinforce the plastic of the fibrous material, such as Kevlar, "Spectra-Shield" manufactured by Allied Chemical, "E Glass" manufactured by Owens Corning Fiberglass and "Twaron" manufactured by Akzo of the Netherlands. Still further, for higher threat levels, the fibrous material could be applied to the entire vehicle interior (e.g. atop top wall 22 of tunnel 20), the ballistic panel/blast shield could extend across the entire width of the underbody of the vehicle, and the ballistic panel/blast shield could extend a full 180° entirely around the front and rear wheel wells and to the front and rear edges of the vehicle. Accordingly, the invention is to be limited only by the scope of the following claims and their equivalents.

What is claimed is:

1. In a land vehicle with a floor having upper and lower floor surfaces and having at least one wall connected to said floor, extending upwardly therefrom and having an inner wall surface, blast pressure and shrapnel fragment defeating structure for said vehicle comprising:

fibrous material bonded to said upper surface of said floor and said inner surface of said wall;

a ballistic panel/blast shield disposed below said lower surface of said floor and spaced therefrom so as to form an air gap therebetween;

fasteners securing said panel to said vehicle; and resilient material disposed between said panel and vehicle in the area of said fasteners.

2. The structure of claim 1 wherein said floor is fabricated from about 0.06" thick aluminum.

3. The structure of claim 1 wherein said fibrous material is about 0.36" to 0.60" thick glass fiber reinforced plastic material.

4. The structure of claim 3 wherein said fibrous material is bonded to said floor with high elongation urethane adhesive.

5. The structure of claim 1 wherein said ballistic panel/blast shield is fabricated from about 0.125" thick steel.

6. The structure of claim 1 wherein said ballistic panel/blast shield and floor form an air gap therebetween of about 1.6" to 1.8".

7. The structure of claim 1 wherein said ballistic panel/blast shield has outboard and inboard lateral edges, and wherein said resilient material is located at said inboard and outboard edges, and wherein said material at said inboard edge is about 0.5" thick by 1.18" wide 60 durometer rubber, and wherein said material at said outboard edge is about 0.25" thick by 2.00" wide closed cell foam.

8. In a land vehicle with a floor having upper and lower floor surfaces and having at least one wall connected to said floor, extending upwardly therefrom and having an inner wall surface, blast pressure and shrapnel fragment defeating structure for said vehicle comprising:

fibrous material secured to said upper surface of said floor and said inner surface of said wall; and a ballistic panel/blast shield disposed below said lower surface of said floor and spaced therefrom so as to form an air gap therebetween.

9. In a land vehicle with a floor having upper and lower floor surfaces, blast pressure and shrapnel fragment defeating structure for said vehicle comprising:

fibrous material secured to said upper surface of said floor;

a ballistic panel/blast shield disposed below said lower surface of said floor and spaced therefrom so as to form an air gap therebetween;

fasteners securing said panel to said vehicle; and resilient material disposed between said panel and vehicle in the area of said fasteners.

10. In a land vehicle with a floor having upper and lower surfaces, blast pressure and shrapnel defeating structure for said vehicle comprising:

fibrous material secured to said upper surface of said floor; and a ballistic panel/blast shield disposed below said lower surface of said floor and spaced therefrom so as to form an air gap therebetween.

11. In a vehicle having a body with first and second surfaces, blast pressure and shrapnel fragment defeating structure for said body comprising:

fibrous material secured to one of said first and second surfaces of said body; and a ballistic panel/blast shield confronting the other of said first and second surfaces and spaced therefrom so as to form an air gap therebetween.

12. The vehicle of claim 11 wherein said fibrous material is bonded to said one surface with adhesive.

13. The vehicle of claim 11 further including resilient material disposed between said one surface and said panel.

14. For a skin having first and second surfaces and defining an enclosure, blast pressure and fragment defeating structure for protecting said enclosure comprising:

fibrous material secured to one of said first and second surfaces of said skin; and a ballistic panel/blast shield spaced from said skin so as to define an air gap therebetween.

15. The structure of claim 14 wherein said ballistic panel confronts the other of said first and second surfaces.

16. The structure of claim 14 wherein said fibrous material is bonded to said one surface with adhesive.

17. The structure of claim 14 further including resilient material disposed between said one surface and said panel.

18. The structure of claim 17 further including fasteners fastening said resilient material and ballistic panel/blast shield to the enclosure.

19. An armored vehicle comprising:

a body having a pair of front wheel wells and a pair of rear wheel wells and a floor extending between said front and rear wheel wells;

a frame for supporting said body;

glass fiber reinforced plastic bonded to said floor and wheel wells of said body; and a ballistic panel/blast shield spaced below said floor and wheel wells of said body so as to define an airgap therebetween;

said ballistic panel/blast shield being secured to said body and said frame.

20. The armored vehicle of claim 19 wherein said glass fiber reinforced plastic is bonded to a vehicle interior surface of said floor and wheel wells.

21. The armored vehicle of claim 19 wherein elastomeric spacers are interposed between said ballistic panel/blast shield and said body and frame at points of securement therebetween.

* * * * *

UNITED STATES PATENT AND TRADEMARK OFFICE
CERTIFICATE OF CORRECTION

PATENT NO. : 5,533,781
DATED : July 9, 1996
INVENTOR(S) : Charles A. Williams

It is certified that error appears in the above-indentified patent and that said Letters Patent is hereby corrected as shown below:

Column 6, line 1, "Kevlar," should read -- "KEVLAR®"

manufactured by E.I. du Pont de Nemours and Company,

Wilmington, Delaware, --.

Signed and Sealed this

Twenty-seventh Day of July, 1999

*Attest:*

Q. TODD DICKINSON

*Attesting Officer*        Acting Commissioner of Patents and Trademarks